(12) United States Patent
Peru et al.

(10) Patent No.: US 11,208,149 B2
(45) Date of Patent: Dec. 28, 2021

(54) ADJUSTABLE REINFORCING ELEMENT FOR A MOTOR VEHICLE BODY FOR PROTECTION IN CASE OF A REAR IMPACT OR SIDE IMPACT

(71) Applicant: PSA AUTOMOBILES S.A., Poissy (FR)

(72) Inventors: Marc Peru, Chatenay-Malabry (FR); Richard Zeitouni, Bois d'Arcy (FR)

(73) Assignee: PSA AUTOMOBILES SA, Poissy (FR)

( * ) Notice: Subject to any disclaimer, the term of this patent is extended or adjusted under 35 U.S.C. 154(b) by 429 days.

(21) Appl. No.: 16/321,794

(22) PCT Filed: Jul. 6, 2017

(86) PCT No.: PCT/FR2017/051838
§ 371 (c)(1),
(2) Date: Jan. 29, 2019

(87) PCT Pub. No.: WO2018/024954
PCT Pub. Date: Feb. 8, 2018

(65) Prior Publication Data
US 2021/0139078 A1     May 13, 2021

(30) Foreign Application Priority Data
Aug. 2, 2016   (FR) ...................................... 1657487

(51) Int. Cl.
*B62D 21/15*   (2006.01)
*B60K 1/04*    (2019.01)
(Continued)

(52) U.S. Cl.
CPC .............. *B62D 21/155* (2013.01); *B60K 1/04* (2013.01); *B60K 15/063* (2013.01);
(Continued)

(58) Field of Classification Search
CPC .... B62D 21/155; B62D 29/008; B62D 25/08; B60K 1/04; B60K 2001/0416;
(Continued)

(56) References Cited

U.S. PATENT DOCUMENTS 2,910,131 A * 10/1959 Krotz ..................... B60K 17/30
                                                     180/234
3,556,243 A *  1/1971 Susag ..................... B62D 7/14
                                                     180/414
(Continued)

FOREIGN PATENT DOCUMENTS

DE   102013203504 A1   10/2013
WO      2012086297 A1    5/2014

OTHER PUBLICATIONS

International Search Report for corresponding PCT/FR2017/051838, dated Sep. 29, 2017.
(Continued)

*Primary Examiner* — Frank B Vanaman
(74) *Attorney, Agent, or Firm* — Sandberg Phoenix & von Gontard, P.C.

(57) ABSTRACT

A reinforcing element (10) for a motor vehicle body (1) comprising protection means (30, 31, 40, 41, 42) for protection against an impact at the rear of the vehicle, characterised in that it comprises at least two tubes (20, 22) to be positioned, generally, in the length direction of the vehicle, and a rigid contact surface (30, 31, 70) turned towards the rear, the rigid contact surface (30, 31, 70) and the two tubes (20, 22) being arranged with respect to each other in order to allow the vehicle to move in case of an impact at the rear.

9 Claims, 4 Drawing Sheets

(51) Int. Cl.
*B60K 15/063* (2006.01)
*B62D 29/00* (2006.01)

(52) U.S. Cl.
CPC .... *B62D 29/008* (2013.01); *B60K 2001/0416* (2013.01); *B60K 2015/0638* (2013.01)

(58) Field of Classification Search
CPC .......... B60K 2001/0438; B60K 15/063; B60K 2015/0634; B60K 2015/0638; B60Y 2306/01
See application file for complete search history.

(56) References Cited

U.S. PATENT DOCUMENTS

| | | | | |
|---|---|---|---|---|
| 3,604,528 A * | 9/1971 | Williamson | ......... | B62D 7/1509 180/414 |
| 3,709,314 A * | 1/1973 | Hickey | ................ | B60G 17/02 180/249 |
| 3,724,585 A * | 4/1973 | Conrad | ............... | B62D 7/1509 180/414 |
| 4,398,616 A * | 8/1983 | Braden | ............... | B62D 7/1509 180/414 |
| 4,522,416 A * | 6/1985 | Sano | ................... | B62D 7/1527 180/410 |
| 4,614,351 A * | 9/1986 | Sano | ................... | B62D 7/1527 180/409 |
| 4,621,702 A * | 11/1986 | Kanazawa | ........... | B62D 7/1536 180/236 |
| 4,830,396 A * | 5/1989 | Gandiglio | ................ | B60G 3/14 280/124.109 |
| 2002/0175538 A1* | 11/2002 | Porner | ................... | B62D 21/11 296/204 |
| 2003/0189334 A1* | 10/2003 | Kawasaki | ................ | B60K 1/04 280/834 |
| 2007/0251751 A1* | 11/2007 | Ball | ....................... | B62D 21/05 180/312 |
| 2008/0111048 A1 | 5/2008 | Jang | | |
| 2011/0148089 A1* | 6/2011 | Klimek | ................... | B60K 1/04 280/830 |
| 2013/0248267 A1* | 9/2013 | Nitawaki | ................. | B60K 1/04 180/68.5 |
| 2014/0191105 A1 | 7/2014 | Dandekar et al. | | |
| 2014/0333091 A1* | 11/2014 | Stockard | .............. | B62D 21/155 296/187.03 |

OTHER PUBLICATIONS

Written Opinion for corresponding PCT/FR2017/051838, dated Sep. 29, 2017.

* cited by examiner

ADJUSTABLE REINFORCING ELEMENT FOR A MOTOR VEHICLE BODY FOR PROTECTION IN CASE OF A REAR IMPACT OR SIDE IMPACT

CROSS-REFERENCE TO RELATED APPLICATIONS

This application is the US National Stage under 35 USC § 371 of International Application No. PCT/FR2017/051838 filed Jul. 6, 2017, which claims priority to French App. No 1657487 filed Aug. 2, 2016; both of said applications being incorporated herein by references.

BACKGROUND

The invention is within the field of motor vehicle bodies, in particular electric or hybrid motor vehicles.

These vehicles must be protected in case of impact, in particular rear impact or side impact.

There is a particular interest in protection from so-called "70% offset" rear impacts, for example at a speed of 80 km/h or other high speed. This is a high-energy impact. There is also an impact in the class of impacts called "side pole impact (centered on the rear)". This is a very intrusive impact. These impact categories are non-limiting for the purposes of the present disclosure, but are mentioned as an illustration.

It is desirable for vehicles to be well protected in case of impact, but nevertheless to retain a lighter silhouette. There is therefore a wish to develop hybrid or electric propulsion vehicles using the lines as units with compact rears, with a larger wheelbase and a smaller rear overhang, and/or copying existing rear axle (rear suspension systems). There is also an interest in using cost-effective rear axle systems (rear axle with deformable crossmember, in particular).

If a rear axle with deformable crossmember is reused, for which one wishes to copy the body, there is cause to add, for an electric vehicle, two battery modules, in front of and behind the axle, below the body of the vehicle, and for a hybrid vehicle, a battery module behind the axle and a fuel tank in front of the axle. These elements, placed on either side of the vehicle, must be protected in case of rear impact or side impact.

To satisfy these new constraints, the state of the art consists of reinforcing the existing designs in terms of the strength of the body understructure. For example, it is possible to insert a central auxiliary longitudinal member for rear impacts, or a continuous chassis frame rail reinforcement and an inner reinforcement for side impacts: this is reflected by an increase in the mass of the structure, but also the challenge to the rear unit, which involves costly investments for a new industrial facility. This also involves a higher mass.

SUMMARY

WO201286297 discloses a body structure with controlled buckling of a battery support frame. However, the support frame is not configured to stiffen the structure and allow the vehicle to be set in motion in case of rear impact.

An effort has therefore been made to design a system that satisfies the previous constraints without having the mentioned defects.

Proposed in this context is a reinforcing element for a motor vehicle body, the reinforcing element comprising protection means for protecting against an impact at the rear of the vehicle, characterized in that it comprises at least two tubes to be positioned, generally, in the length direction of the vehicle and to be fastened to the body as well as a rigid contact surface comprising impactors. The rigid contact surface is arranged opposite the two tubes to allow the vehicle to be set in motion in case of impact at the rear, the reinforcing element additionally comprising energy absorbing means protruding opposite the rigid contact surface and to be positioned toward the rear of the vehicle, such that the impactors only come into play for setting in motion if the energy absorbing means have been stressed and overcome by such an impact at the rear.

The reinforcing element may also comprise the following optional and advantageous features:
- a protection structure for a battery or a fuel tank that may be present below the body of the vehicle;
- for each side of the vehicle, a rigid contact surface oriented toward the side to absorb the energy from any side impact;
- a means for fastening to the adjustable body to adapt to the wheelbase of the vehicle;
- three tubes to be positioned generally in the direction of the length of the vehicle, to stiffen the reinforcing element and transmit the energy in the forward direction; these three tubes to be positioned generally in the direction of the length of the vehicle for example comprise two tubes to be placed between a rear axle and the body, and a third tube, midway between said two tubes, being such that the rear axle is to be placed between the body and said third tube;
- on at least one of the tubes, a means for fastening to the body bottom, opposite the rigid contact surface.

The reinforcing element can be made up of steel or aluminum tubes.

Also proposed is a motor vehicle with a rear axle having a deformable crossmember, characterized in that it also comprises a reinforcing element as described above.

This motor vehicle may comprise a first battery below the body and behind the rear axle and respectively a second battery or a fuel tank below the body and in front of the rear axle, the first battery and respectively the second battery or the fuel tank being protected by the reinforcing element.

DESCRIPTION OF THE FIGURES

The invention will be better understood, and other aims, features, details and advantages thereof will appear more clearly in the following explanatory description done in reference to the appended drawings, provided solely as an example illustrating embodiments of the invention and in which.

DETAILED DESCRIPTION

Figure 1:
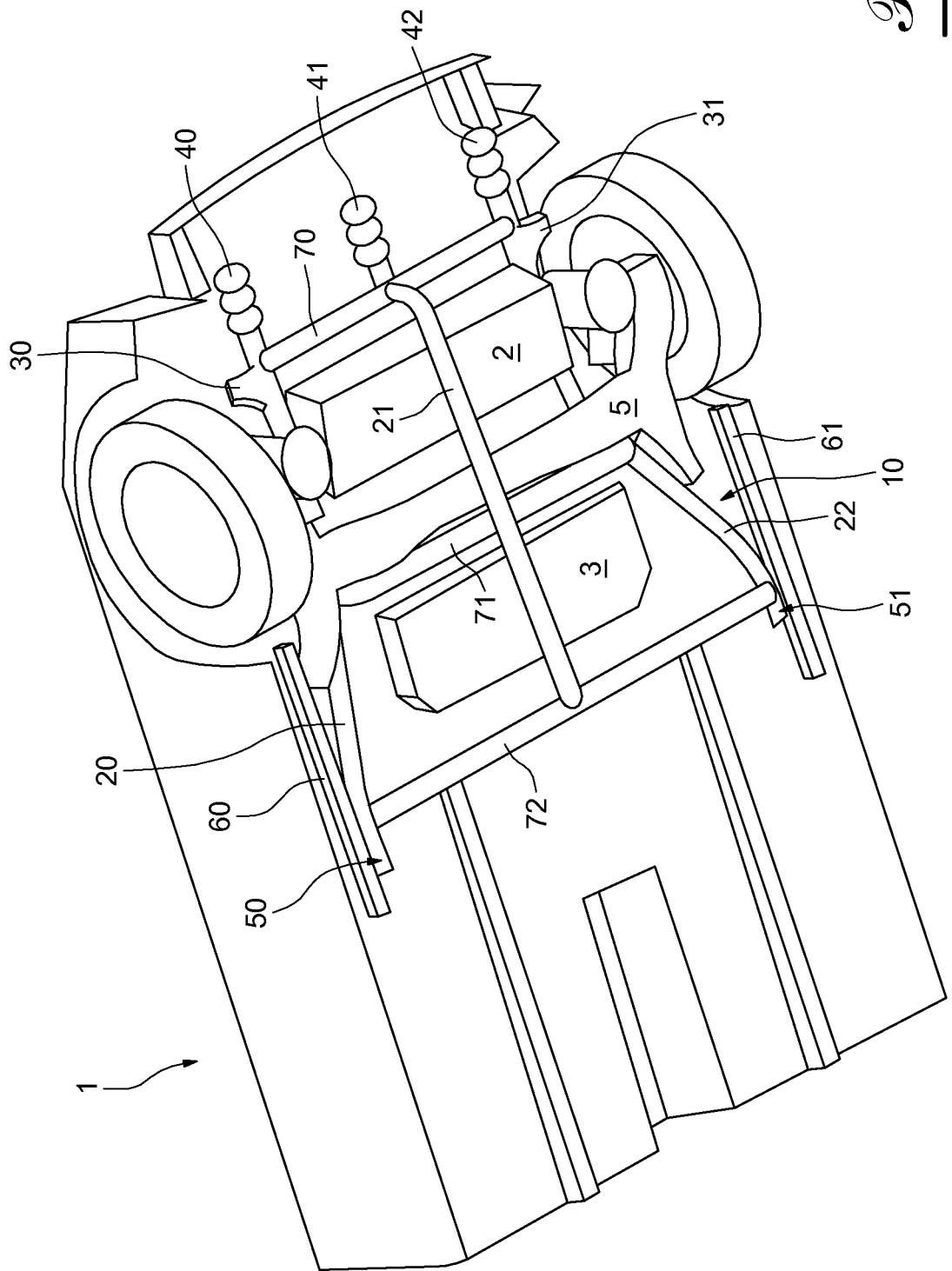
FIG. 1 shows a first version of a reinforcing element placed on an electric vehicle.

FIG. 1 shows the rear part of the body 1 of a motor vehicle, seen from below. One can in particular see the batteries 2 and 3 placed below the inner surface of the body, across the vehicle, on either side of the rear axle 5. This is a rear axle with a deformable crossmember, which has the advantage of being cost-effective.

The vehicle is equipped with a reinforcing element 10 in the form of an arrangement of tubes welded to one another. The reinforcing element, in particular, comprises longitudinal tubes 20, 21 and 22, on the left of the vehicle, in the middle of the vehicle and on the right of the vehicle. The tube 21, midway between the tubes 20 and 22, is placed such that the batteries 2 and 3 and the axle 5 are placed between the body 1 and the tube 21. The tubes 20 and 22 are in turn placed so as to be placed between the axle 5 and the body 1.

Toward the rear, the reinforcing element 10 comprises two side impactors 30 and 31 making up a rigid contact surface, having a barrier function, for setting the vehicle in motion in case of a rear impact. These two structures 30 and 31 are in the same position on each of the two sides of the body. They are connected by a tube of the structure, which will be mentioned later.

Also seen at the rear, the reinforcing element 10 comprises three absorbers 40, 41 and 42 having an energy absorption role in case of rear impact. They are able to deform to perform a buffer role, and to prevent the rest of the vehicle from receiving too much energy. They are mounted on sliding tubes so that their length is adapted to the rear overhang of the vehicle on which the reinforcing element is mounted. They protrude relative to the rigid surface defined by the impactors 30 and 31 and the tube connecting them. They are to be positioned toward the rear of the vehicle.

The impactors 30 and 31 only come into play if the absorbers 40, 41 and 42 have been stressed and overcome, by a high-energy impact.

The reinforcing element 10 includes the fastening zones 50 and 51, respectively on the left and right of the vehicle. They make it possible, for example using a screw-nut system, to fasten the tubular frame, or reinforcing element, to the body, and adjust it depending on the wheelbase of the vehicle. These fastening zones are essentially at the end of the longitudinal tubes 20 and 22.

The reinforcing element 10 also includes side bars 60 and 61, fastened to the longitudinal tubes 20 and 22, and extending along the side of the body, to serve as reinforcement in case of side impact. They constitute rigid contact surfaces, oriented toward the side to absorb the energy of a side impact.

The reinforcing element 10 also includes transverse tubes to maintain its various elements relative to one another. There is a rear transverse tube 70, connecting the longitudinal tubes to one another at their rear ends, at the height of the impactors 30 and 31. There is a front transverse tube 72, connecting the longitudinal tubes to one another at their front ends, and an intermediate transverse tube 71, also connecting the three longitudinal tubes to one another.

Thus, one has an optimized tubular frame, or reinforcing element 10, comparable to a framework, and acting to protect against rear impact and side impact. It reinforces the structure by stiffening it. It is made up of steel tubes or aluminum profiles. The tubes are arranged to make up a protection structure for a battery or a fuel tank present below the body, or several batteries and fuel tanks.

The longitudinal tubes 20, 21 and 22 are positioned generally in the direction of the length of the vehicle, and, with the rigid contact surface oriented toward the rear made up of the impactors 30 and 31 and the transverse tube 70 connecting them, due to their mutual arrangement (by welding or any other rigid immobilization means of the tubes with respect to one another), allow the vehicle to be set in motion in case of impact at the rear.

It causes the vehicle to be set in motion more quickly in case of rear impact, owing to its general stiffness and the function contributed by the impactors 30 and 31, serving, combined with the rear transverse tube 70, as pushing device owing to their contact surface, which makes it possible to prevent too much energy from having to be absorbed in the vehicle. The optimized tubular frame, or reinforcing element, additionally makes it possible to have an energy absorption capacity in case of side impact to protect the members of the battery. Lastly, it adapts to several installations and is adjustable based on the wheelbase and overhang of the silhouette of the vehicle.

Ultimately, this reinforcing element 10 improves the protection of the vehicle and is adjustable depending on the vehicle. Since it is a tubular structure, the steel consumption is kept modest. It is, for example, possible to save 5 kg of steel relative to a traditional system comprising non-tubular reinforcements.

Figure 2:
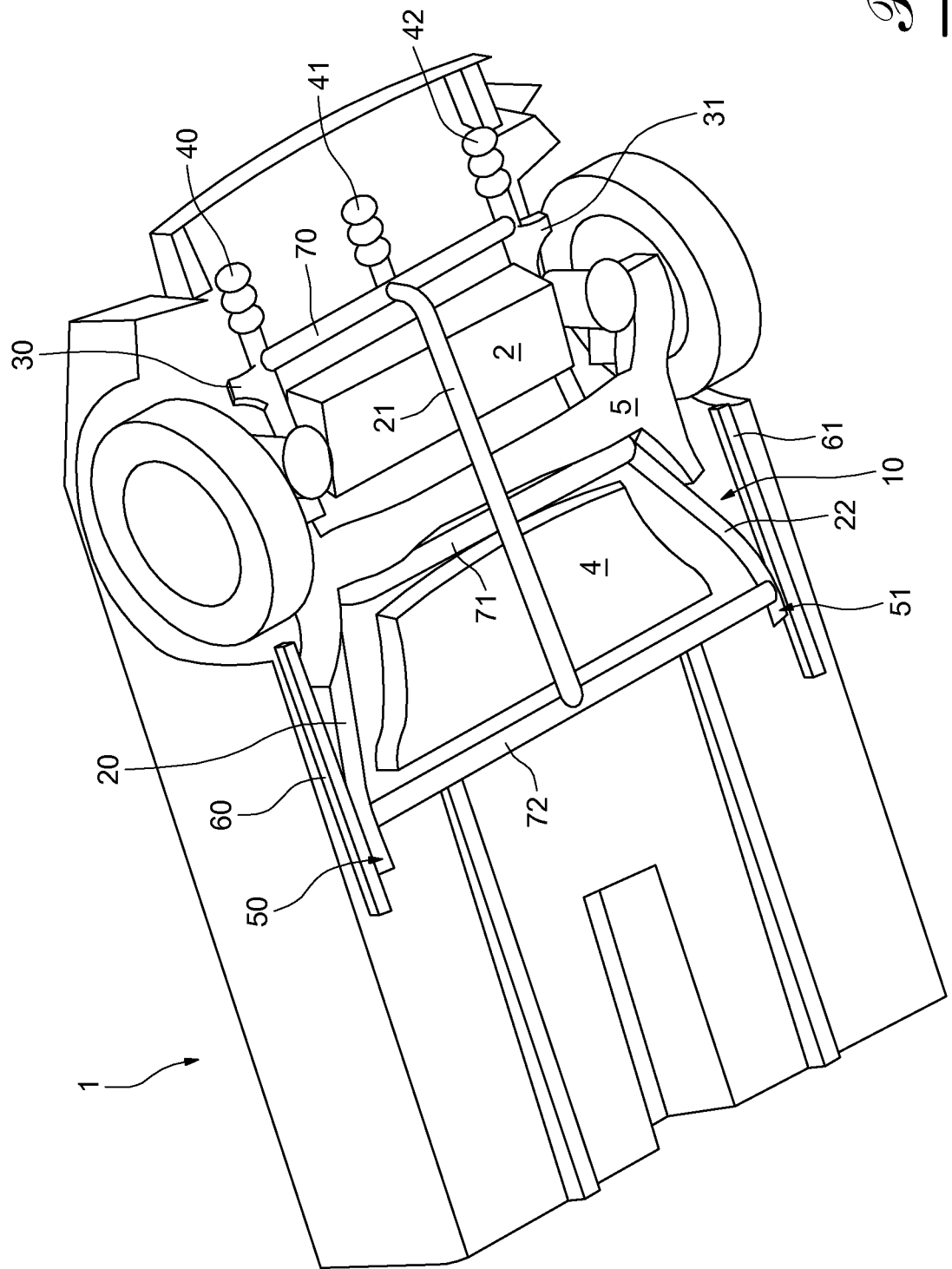
FIG. 2 shows the same reinforcing element, but placed on a hybrid vehicle.

FIG. 2 shows that the structure of FIG. 1 adapts very easily on a vehicle comprising, instead of the batteries 2 and 3 (FIG. 1), a battery 2 behind the axle 5, and a fuel tank 4 in front of the axle 5. The tank 4 is larger than the battery 3, but the reinforcing element 10 is suitable for adapting to its bulk and protecting it.

Owing to this first version of the reinforcing element, the fragile members (i.e., the batteries and fuel tank) are protected in case of rear impact or side post impact.

Optionally, the rear unit of the body can be made lighter with respect to the reference unit from which the model is developed, since the reinforcing element 10 reinforces it.

Figure 3:
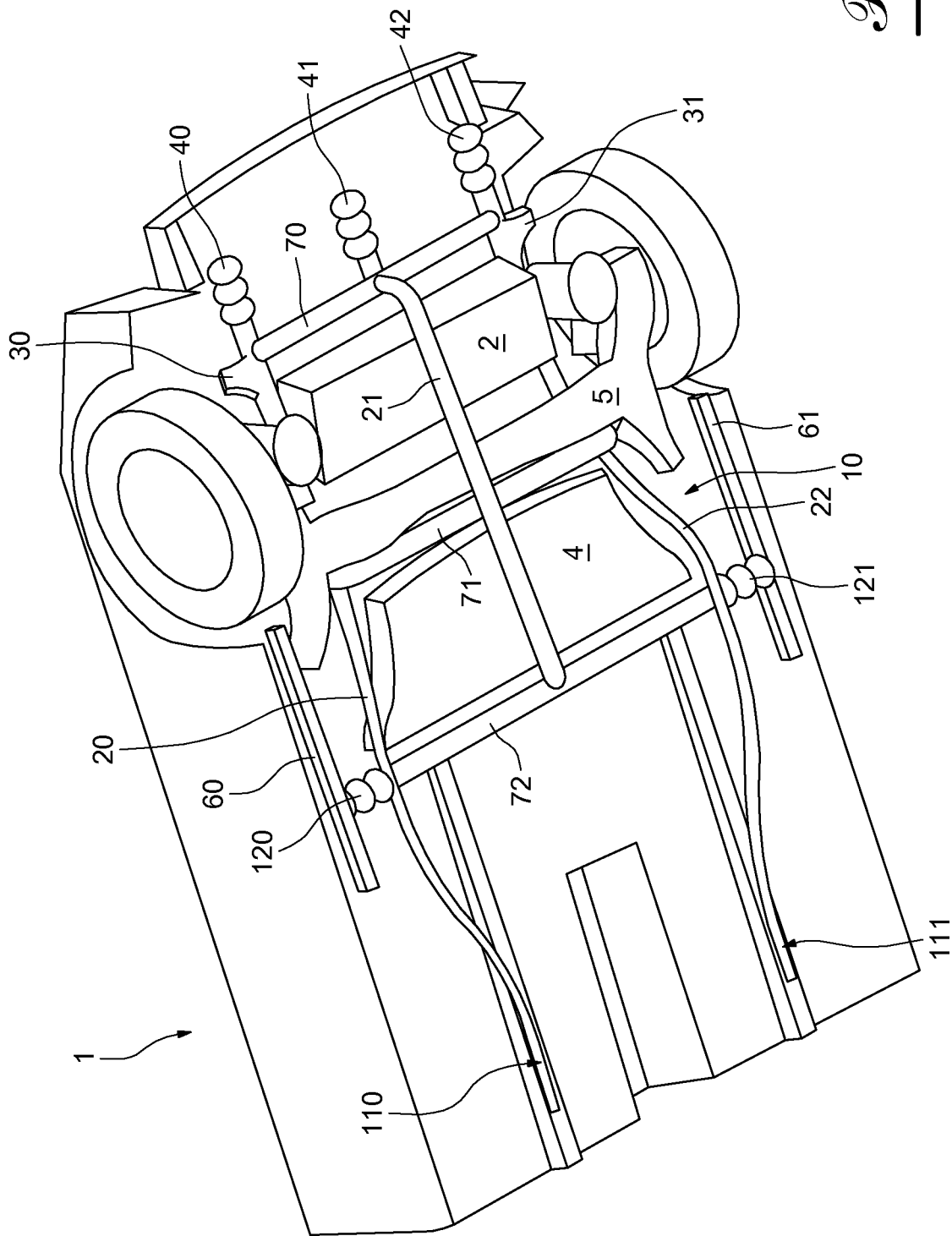
FIG. 3 shows a second version of the reinforcing element, on a hybrid vehicle.

FIG. 3 shows an alternative reinforcing element, derived from FIG. 1, in which the longitudinal tubes 20 and 22 are extended toward the front of the vehicle. The tubes 20 and 22 are fastened by fastening zones 110 and 111 on the underfloor or bottom of the vehicle, using a system, for example a screw-nut system. The tubes 20 and 22 are optionally flattened at the height of the fastener. They are not fastened by the fastening zones previously described 50 and 51 (FIG. 1).

The front transverse tube 72 is remote from the end of the longitudinal tubes 110 and 111, and near the fuel tank 4, or the intermediate transverse tube 71.

The reinforcing element 10, in this alternative reinforcing element, includes side absorbers 120 and 121, at the height of the front transverse tube 72, fastened to the longitudinal tubes 20 and 22, arranged horizontally and turned toward the outside of the vehicle. The side bars 60 and 61 are supported by these side absorbers 120 and 121. The side absorbers 120 and 121 make up a deformable energy absorption zone in case of side post impact at the rear. They protect the battery 2 and the tank 4.

Figure 4:
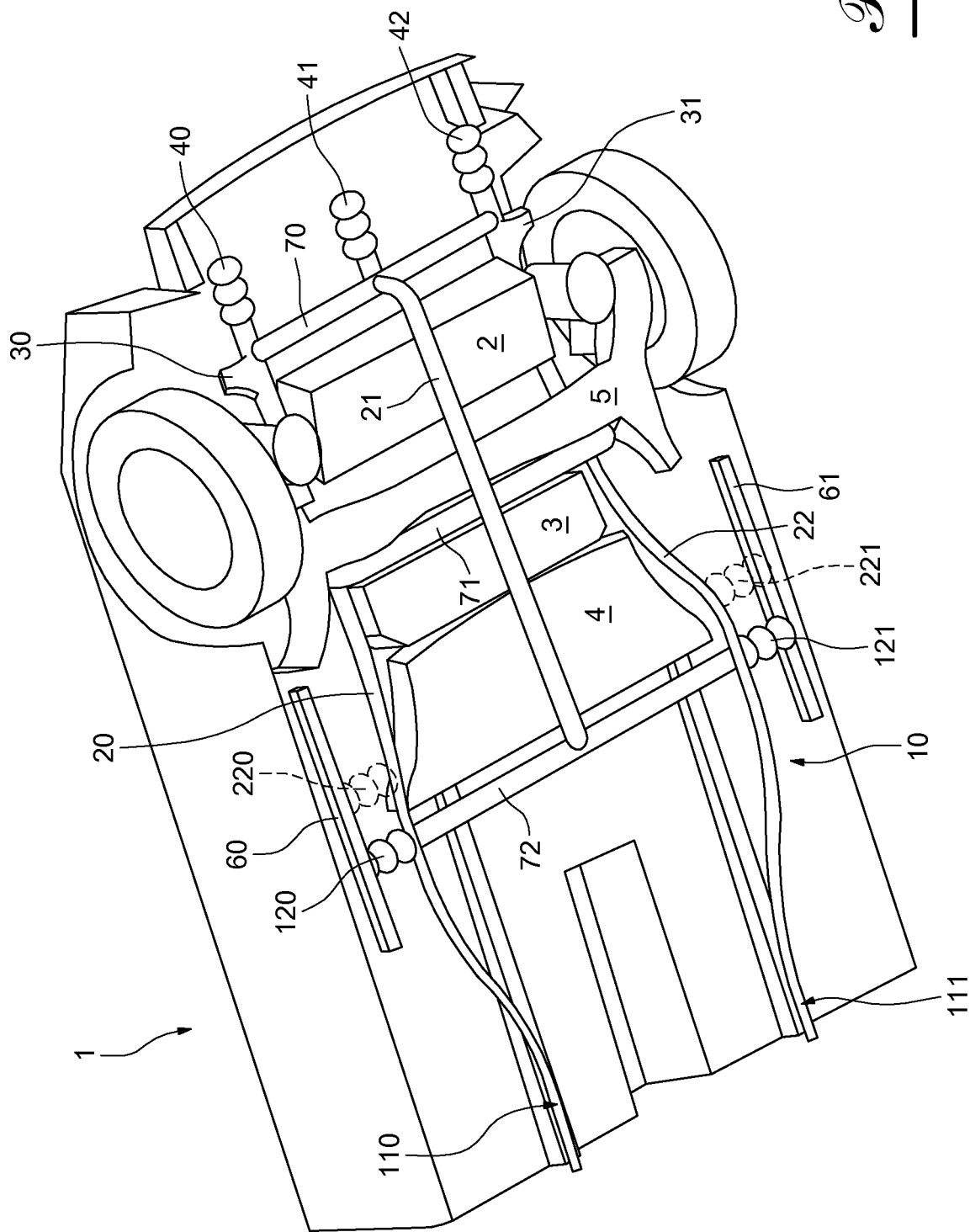
FIG. 4 shows a third version of the reinforcing element on a hybrid vehicle equipped with two batteries.

FIG. 4 shows another alternative reinforcing element, derived from that of FIG. 3. In this alternative, the longitudinal tubes 20, 21 and 22 are all elongated, so as to accommodate the presence, in front of the axle 5, simultaneously of a battery 3 and a tank 4, making up a larger volume of members. They are both placed below the body, the tank 4 being further forward than the battery 3. The transverse tube 72 is moved forward, as well as the side absorbers 120 and 121.

It is possible to add side absorbers 220 and 221 in duplicate opposite the aforementioned absorbers 120 and 121, between the longitudinal tubes 20 and 22 and the side bars 60 and 61. This makes it possible to absorb the energy in the case of violent impact with a side post, for example if the vehicle is heavy.

It will be specified that the reinforcing element 10 prevents the rear axle 5 from experiencing a shock or impact during impacts at the rear, which then makes it possible to use a more cost-effective rear axle, such as an axle with deformable crossmember.

The reinforcing element 10 has a configurable use, since it adapts to bodies including batteries or tanks, in variable number, and it adapts to bodies with different dimensions (overhang and wheelbase).

The invention claimed is:

1. A reinforcing element for a motor vehicle body, the reinforcing element comprising protection means for protecting against an impact at the rear of the vehicle, wherein the protection means comprises three tubes to be positioned generally in the direction of the length of the vehicle, two tubes of which are to be placed between a rear axle assembly of the vehicle and the body, and a third tube, midway between said two tubes, being such that the rear axle is between the body and said third tube, and a rigid contact surface comprising impactors, the rigid contact surface being arranged opposite the two of said tubes to allow the vehicle to be set in motion in case of a rear impact, the reinforcing element additionally comprising energy absorbing means protruding opposite the rigid contact surface, the energy absorbing means being positioned toward the rear of the vehicle, such that a force of a rear impact is transferred to the impactors to set the vehicle in motion only if the force of the rear impact overcomes the energy absorbing means.

2. The reinforcing element according to claim 1, wherein the reinforcing element comprises a protection structure for a battery or a fuel tank present under the body of the vehicle.

3. The reinforcing element according to claim 1, wherein the reinforcing element comprises, for each side of the vehicle, a rigid contact surface oriented toward a side of the vehicle to absorb energy from a side impact.

4. The reinforcing element according to claim 1, wherein the reinforcing element includes at least one fastening means for fastening to an adjustable body to adapt to the wheelbase of the vehicle.

5. The reinforcing element according to claim 1, wherein the reinforcing element comprises, on at least one of the tubes, a means for fastening the tube to a bottom of the body.

6. The reinforcing element according to claim 1, wherein the reinforcing element is essentially made up of steel or aluminum tubes.

7. A motor vehicle with a rear axle having a deformable crossmember, wherein the vehicle also comprises a reinforcing element according to claim 1.

8. The motor vehicle according to claim 7, wherein the vehicle comprises a first battery beneath the body and behind the rear axle, and a second battery or a fuel tank beneath the body and in front of the rear axle, the first battery and the second battery or the fuel tank being protected by the reinforcing element.

9. The reinforcing element according to claim 1, wherein the third tube is sized and shaped such that batteries and/or fuel tanks mounted to the bottom of the vehicle are between the body and the third tube.

* * * * *